REDUCTION OF QUADRATURE DISTORTION

Filed Nov. 29, 1952 2 Sheets-Sheet 1

INVENTOR
J. M. EGLIN
BY
ATTORNEY

INVENTOR
J. M. EGLIN
BY [signature]
ATTORNEY

United States Patent Office 2,717,956

Patented Sept. 13, 1955

2,717,956

REDUCTION OF QUADRATURE DISTORTION

James M. Eglin, Glen Rock, N. J., assignor to Bell Telephone Laboratories, Incorporated, New York, N. Y., a corporation of New York Application November 29, 1952, Serial No. 323,314

8 Claims. (Cl. 250—6)

Figure 1:
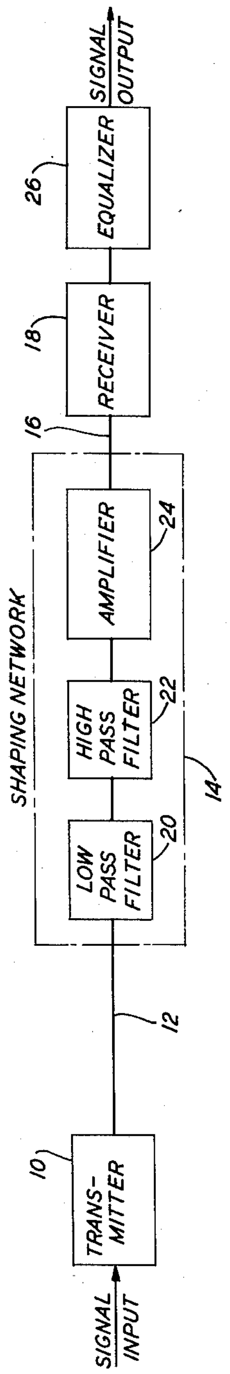

This invention relates to communication systems and more particularly to systems of the type in which vestigial sideband transmission is employed.

The vestigial sideband method of transmission has found considerable acceptance for use in communication systems over which it is necessary to transmit signals having very low frequency or direct current components. Such signals are commonly associated with television and other picture transmission circuits in connection with which the increased useable band width afforded by vestigial sideband transmission is also advantageous. The use of the vestigial sideband technique, however, results in undesired distortions in the recovered message information and many attempts have been made to minimize such distortions by choice of transmission characteristics and the like.

Ideally, a vestigial sideband system includes a transmitter in which a carrier wave is modulated by a message signal to produce an output including in general both a carrier component and upper and lower sidebands. This output is subjected to shaping circuits which act to suppress a major portion of one sideband and to modify the transmission in the range of frequencies immediately adjacent the carrier frequency. Typically the shaping circuits may transmit all frequencies falling in a chosen sideband without modification of amplitude except for those frequencies in the range between the carrier frequency and an adjacent frequency $f$. In this range the transmission decreases with frequency and falls to zero at a frequency within the other sideband and also removed from the carrier by an amount $f$. A transmission characteristic of this general type is not symmetrical about the carrier and results in the presence of a quadrature component in the transmitted wave. This component may be eliminated by the homodyne system of detection at the receiver but in many instances it has been necessary to employ envelope detection. In such cases the demodulated output of the receiver is distorted by the presence of components in addition to that arising from the in-phase component of the transmitted wave which correspond to the quadrature component of the transmitted wave.

Such distortion, which is commonly referred to as quadrature distortion, can be somewhat reduced by appropriate choice of the shaping characteristic employed in generating the vestigial sideband signal. The idealized characteristic referred to above and other transmission characteristics which have heretofore been employed have been so chosen that the demodulated wave would be the best possible reproduction of the applied message signal if there were no quadrature distortion. However, a certain amount of undesired quadrature distortion has been accepted as unavoidable and the best compromise possible has been made between this and other components which are effectively distortions of the in-phase signal.

It is the object of the present invention to substantially eliminate the effects of quadrature distortion in vestigial sideband systems of the type in which envelope detection is employed.

In view of the above object and in accordance with the invention, the shaping characteristic employed in the generation of the vestigial sideband signal is so chosen as to minimize the quadrature component at the output of the detector without regard to the effect this may have upon the desired in-phase component corresponding to the message wave rather than to produce the best possible replica of the message wave at the output of the demodulator as in past systems. The distortions introduced in the in-phase component by such a choice of characteristic are largely linear and are eliminated by a conventional equalizer circuit connected in the output of the demodulator.

Figures 3, 4:
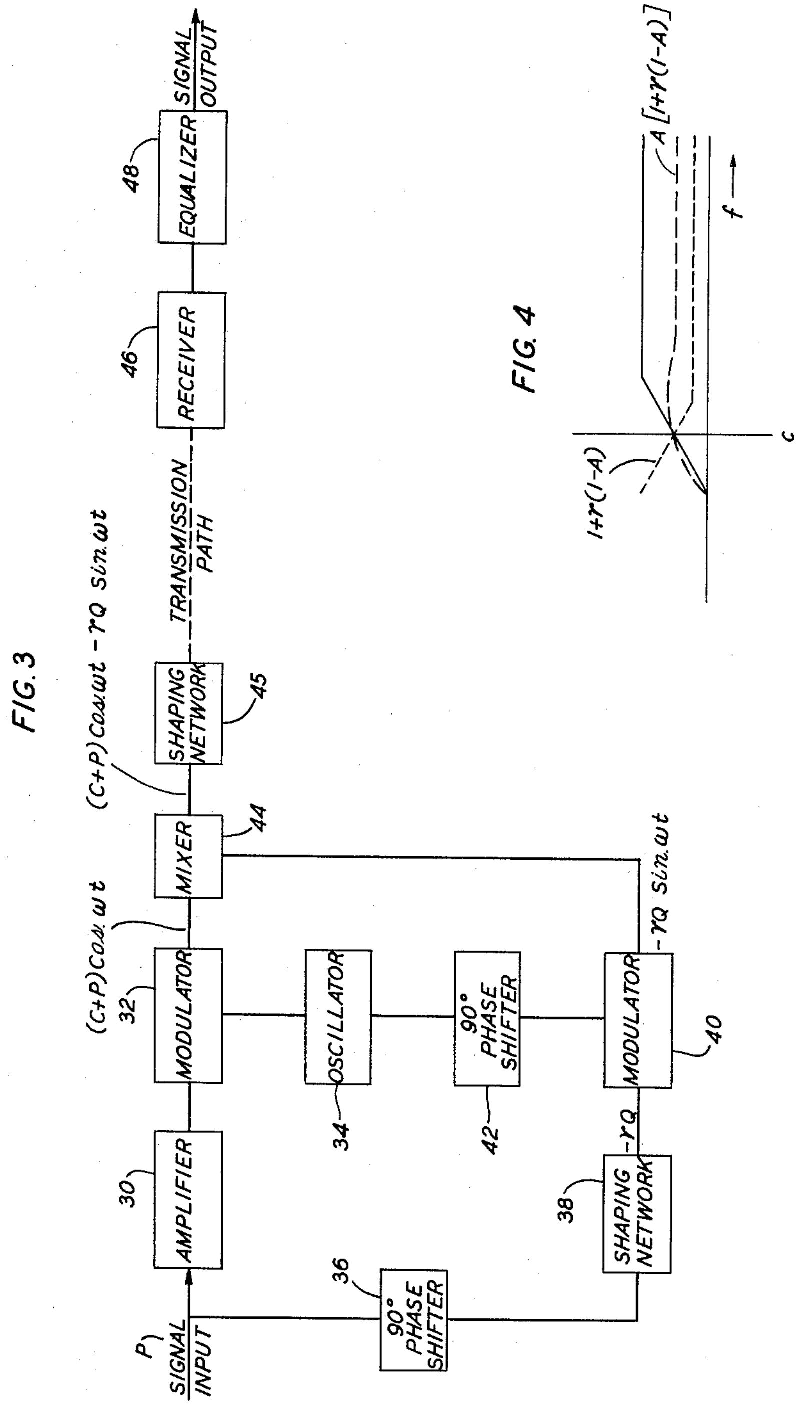

The above and other features of the invention will be described in detail in the following specification taken in connection with the drawings in which:

Fig. 1 is a block schematic diagram of a vestigial sideband transmission system embodying the invention;

Figs. 2*a* through 2*e* are graphs illustrating various characteristics of the system of Fig. 1;

Fig. 3 is a block schematic diagram of an alternative embodiment of the invention; and Fig. 4 is a graph illustrating the operation of the system of Fig. 3.

One vestigial sideband system embodying the invention is disclosed in Fig. 1. In this arrangement a message signal is applied to a transmitter 10 which may be of conventional type arranged to produce an output wave including carrier and upper and lower sideband components. The modulated wave appearing at the output of the transmitter is applied over a lead 12 to a shaping network 14. This network in general introduces an amplitude versus frequency characteristic as required for the production of a vestigial sideband signal. This signal is conducted over a path 16 to a receiver 18 which may be of conventional form and includes an envelope detector. In practice the shaping network may be placed at either the transmitter or the receiver or may be divided between the transmitter and receiver. In any event sufficient shaping must be introduced at the transmitter to obtain the advantages of vestigial sideband transmission. On the other hand such additional shaping as is required according to the invention may advantageously be introduced at the receiver to avoid loading the transmission facility. Depending upon the arrangement chosen either lead 12 or 16 may represent the transmission path which may comprise either a radio or wire facility. If the shaping network is divided between transmitter and receiver as suggested above, appropriate modifications in the circuit will be required.

As has been pointed out above, the system according to the invention differs from known arrangements in that the shaping network 14 is so arranged as to produce the minimum possible amount of quadrature distortion at the output of receiver 18 without particular regard to the effect which this may have upon the shape of the in-phase message wave at this point. The significance of this feature may be explained with reference to the graphs of Figs. 2*a* through 2*f*. Fig. 2*a* represents an idealized transmission characteristic of the type commonly employed in vestigial sideband systems. This graph, which is of a carrier characteristic (a plot of the transmission of the modulated wave as a function of frequency), shows transmission in one sideband A which is constant for all frequency values in excess of a frequency $f$ and a transmission of zero for all frequencies in the other sideband B removed from the carrier by an equal amount $f$. In the range of frequencies surrounding the carrier, the transmission decreases linearly from the desired sideband A through the carrier to the other sideband B. This particular frequency characteristic has found considerable acceptance in vestigial sideband systems because it results in the production at the input of the demodulator of an in-phase component which is substantially undistorted. This may be seen by considering that the equivalent demodulated output wave characteristic is equal essentially to the sum of the two sideband components of the carrier characteristic divided by two. This is illustrated in Fig. 2*e* in which the dashed line curve $$\frac{A+B}{2}$$

illustrates the equivalent characteristic for the in-phase component. It will be recognized that for all frequencies the transmission will be a constant. On the other hand, the carrier characteristic of Fig. 2*a* introduces a substantial quadrature component which may be considered to be the difference between the two sidebands divided by two. This is shown in Fig. 2*e* by the solid line curve $$\frac{B-A}{2}$$

(The horizontal portions of all of the curves of Fig. 2*e* are at an amplitude of $a/2$ but are shown separately for clarity in the drawing.) The presence of this quadrature component leads to distortion of the recovered message wave.

It is proposed according to the invention to substitute for the transmission characteristic shown ideally in Fig. 2*a* that shown in Fig. 2*b*. It will be noted that the characteristic shown in Fig. 2*b* is modified to accomplish two things. First, the transmission in the frequency region immediately adjacent the carrier C is made symmetrical. Further, both the carrier and the frequencies immediately adjacent thereto in the two sidebands are exalted with respect to those falling within the remainder of the transmitted sideband. The effect of such shaping is obvious. The equivalent characteristic of the demodulated wave corresponding to the in-phase coefficient is shown in the dot-dash curve of Fig. 2*e*. This characteristic is the sum of the transmissions A′ and B′ in the two sidebands divided by two and is much greater at low modulating wave frequencies than elsewhere. On the other hand, the demodulated output characteristic for the quadrature component shown by the dotted curve of Fig. 2*e* as being equal to one-half the difference of these quantities, is substantially nil for the low modulating wave frequencies and is much reduced elsewhere.

The idealized transmission characteristics of Figs. 2*a* and 2*b* cannot be realized in actual systems. Fig. 2*c* illustrates the type of characteristic employed in known systems to approximate that of Fig. 2*a*. Various arrangements are available for effectively introducing the type of shaping indicated by the curve of Fig. 2*b*. Fig. 2*d* illustrates one possible shaping characteristic which may be employed according to the invention for the purpose of reducing distortion due to the presence of the quadrature component as deflected in the demodulated output.

One circuit arrangement for producing a transmission characteristic of the type shown in Fig. 2*d* is indicated as comprising shaping network 14 of Fig. 1. For purposes of illustration it is assumed that all shaping is introduced at the receiver although as has been pointed out above this is not necessary. This shaping network includes a low-pass filter 20 and a high-pass filter 22 connected in tandem with a level-restoring amplifier 24. The transmission characteristics of the two filters are shown in the graph of Fig. 2*f*. It will be noted that the high-pass filter has a substantially uniform transmission in one sideband and a cut-off in the other sideband at a frequency removed from the carrier by the amount desired for the vestigial sideband. Low-pass filter 20, on the other hand, has a substantially uniform transmission characteristic in the unwanted sideband which decreases at the carrier and in the transmitted sideband to a value which is equal to substantially one-half the transmission of high-pass filter 22 at the same frequencies. The sum of these characteristics indicated by the solid line curve of Fig. 2*f* closely approximates the curve of Fig. 2*d* and includes a region about the carrier frequency in which the transmission is substantially symmetrical and is exalted with respect to the transmission in the remainder of the desired sideband.

It has been shown that when a transmission characteristic such as that indicated by Fig. 2*b* is introduced by shaping network 14, the output of receiver 18 contains a distorted reproduction of the in-phase component and a greatly reduced quadrature component. These output characteristics as shown in Fig. 2*e* are similar to those which would be obtained with the carrier characteristic of Fig. 2*d*. Examination of the output characteristic corresponding to the in-phase component as shown in the dot-dash curve of Fig. 2*e* indicates that for low-frequency components of the modulating wave transmission is much greater than that for the higher frequency components. However, the resultant distortion of the in-phase component is linear and may be eliminated by known techniques, as for example, by the provision of an equalizer 26 connected in the output of receiver 18 and having a transmission characteristic which is complementary to that indicated by the dot-dash curve of Fig. 2*e*.

Thus, by so choosing the carrier shaping characteristic as to produce minimum quadrature distortion at the output of the receiver and thereafter compensating for distortion of the message wave produced by such a choice of the carrier frequency shaping characteristic, quadrature distortion may be substantially reduced without deleterious effect upon the reproduction of the message wave at the output of the transmission system.

While there has been described one embodiment of the invention in which the necessary shaping for reduction of quadrature component was introduced entirely by a shaping network, the equivalent of such shaping may be obtained by other arrangements such as that shown, for example, in Fig. 3. In the circuit of Fig. 3, the shaping network employed approximates the idealized transmission characteristic of Fig. 2*a* and the equivalent of modifying this characteristic by additional shaping circuits is accomplished by modification of the modulated signal wave prior to the application to the shaping network. This arrangement thus comprises a conventional vestigial sideband system plus certain auxiliary circuits. The conventional system includes a modulator to which are applied a carrier wave of amplitude C and a message wave of amplitude P to produce an output of the following form:

$$(C+P)\cos\omega t \qquad (1)$$

When such a signal is subjected to shaping of the type indicated by the ideal characteristic of Fig. 2*a* a quadrature component is introduced and the transmitted wave is of the following form:

$$(C+P)\cos\omega t+Q\sin\omega t \qquad (2)$$

where Q represents the amplitude of the quadrature component.

If means are provided for adding to the signal output from the modulator a quantity which will reduce the second term of expression (2), the quadrature component appearing at the output of an envelope detector in response to the transmitted wave will likewise be reduced. At first inspection, it would appear that the proper quantity to add would be the following:

$$-Q\sin\omega t \qquad (3)$$

Mathematical analysis, however, indicates that were this quantity added it would serve in addition to cancelling out the unwanted quadrature term also to cancel out those portions of the output corresponding to the in-phase components at the input of the demodulator in that portion of the wanted sideband corresponding to the vestigial sideband. Obviously, once completely cancelled these components cannot be restored by any subsequent operation upon the demodulated output of the receiver.

It has been found, however, in accordance with the invention that quadrature distortion may be substantially reduced by adding to the output of the modulator a quantity equal to $$-rQ \sin \omega t \qquad (4)$$

where $r$ is a fraction. The addition of such a term is the equivalent of the additional shaping introduced by the arrangement of Fig. 1 and produces at the output of the receiver a demodulated signal having a linearly distorted in-phase component and a greatly reduced quadrature component. As in the case of the system in Fig. 1 the in-phase component may be restored by known equalization techinques.

A system for adding the quantity $-rQ \sin \omega t$ to the output of the conventional vestigial sideband system modulator is shown in Fig. 3. The signal or modulating wave is applied to an amplifier 30 and thence to a modulator 32 to which is also applied the output of a carrier oscillator 34. The input wave is also applied to a phase shifter 36 which introduces a 90 degree phase shift and a shaping network 38. The action of phase shifter 36 together with shaping network 38 is to produce from the in-phase signal P a quantity equal to $-r$Q where Q is the quadrature coefficient. The exact details of shaping network 38 must depend upon the carrier shaping employed in the unmodified vestigial sideband system but in general will correspond to the message frequency characteristic obtained by taking the difference between the transmission in the wanted and vestigial sideband and dividing it by two. This characteristic may be obtained by known filter design technique.

The quantity $-rQ$ appearing at the output of shaping network 38 is applied to a second modulator 40 to which is also applied the output of a 90 degree phase shifter 42 which produces from carrier oscillator 34 a carrier which is in quadrature with that applied to modulator 32. The output of modulator 40 which is of the form $-rQ \sin \omega t$ is applied together with the output of modulator 32 to a mixer circuit 44, which may comprise a simple resistance pad. The output of this mixer has the following form:

$$(C+P) \cos \omega t - rQ \sin \omega t \qquad (5)$$

Figure 2:
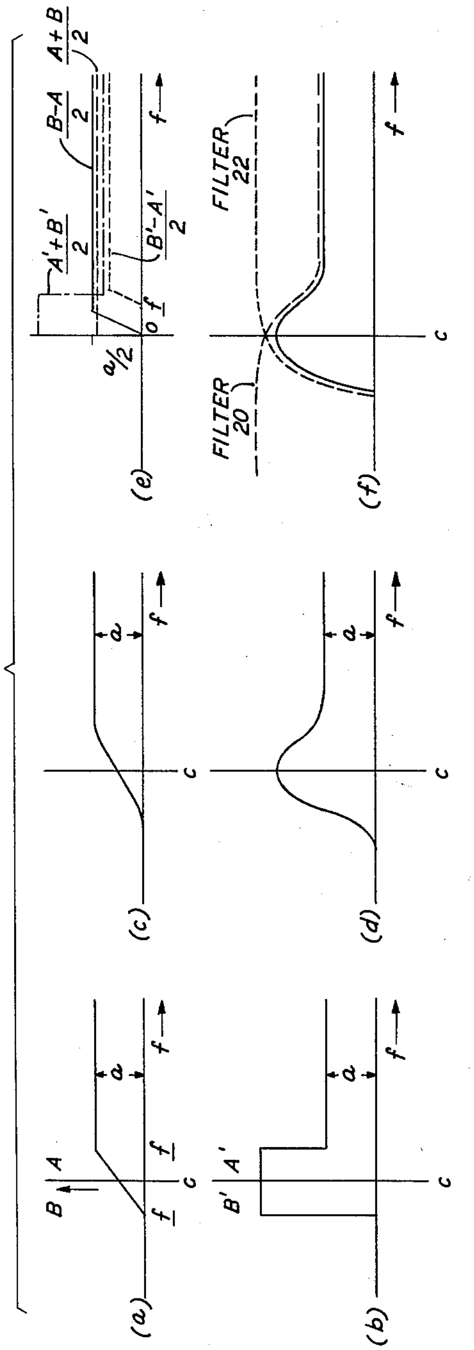

This quantity is subjected to the carrier shaping characteristic of Fig. 2$c$ with the result that the quadrature term is substantially reduced inasmuch as the two terms in $\sin \omega t$ are of opposite sign. After transmission over the transmission path this signal is demodulated by envelope detection in receiver 46 and the linear distortion introduced in the in-phase message signal component by the modification of the output of modulator 40 is eliminated by an equalizer 48.

The arrangement of Fig. 3 is the full equivalent of that of Fig. 1 and acts effectively to modify the carrier shaping introduced by shaping network 45. This may be shown as follows: The carrier shaping characteristic required to get only $Q \sin \omega t$ from the $P \cos \omega t$ appearing at the output of modulator 32 would be $$(A-1) \qquad (6)$$

where A represents the idealized characteristic of Fig. 2$a$ and the amplitude $a$ shown in the drawings is equal to 2. To get $-rQ \sin \omega t$, then, the characteristic required is $$r(1-A) \qquad (7)$$

When the in-phase term is added the characteristic becomes $$1+r(1-A) \qquad (8)$$

which is substantially that shown by the dotted line of

Fig. 4 and in general when this is subjected to the usual shaping A produced by network 45, the resultant is $$[1+r(1-A)]A \qquad (9)$$

which is the product of the solid and dotted line curves of Fig. 4 and is represented by the dashed line curve. It will be recognized that the resultant equivalent carrier characteristic approximates that of Fig. 2$d$ in that the transmission is rendered more symmetrical and is exalted in the area adjacent the carrier frequency.

Other systems may be devised according to the invention is which $-rQ \sin \omega t$ or $(C+P) \cos \omega t + Q \sin \omega t$ are generated directly and added to $(C+P) \cos \omega t$ with the proper relative magnitudes to achieve the desired reduction in quadrature distortion.

What is claimed is:

1. The method of reducing quadrature distortion in vestigial sideband systems employing envelope detection which comprises shaping the modulated wave prior to detection to provide a vestigial sideband signal which results in minimum quadrature component at the output of the detector without regard to distortion of the in-phase component of the detected wave, detecting the transmitting wave, and subjecting the detected output to equalization for the purpose of restoring the shape of the original modulating wave as reproduced at the detector output.

2. The method of reducing quadrature distortion in vestigial sideband systems employing envelope detection which comprises shaping the modulated wave prior to detection to render the vestigial sideband and the corresponding portion of the other sideband substantially symmetrical about the carrier frequency, exalting both carrier and sidebands in the symmetrized area adjacent the carrier frequency, detecting the modified signal, and thereafter correcting the resultant distortion of the modulating wave as reproduced at the detector output.

3. In a vestigial sideband system for transmitting intelligence waves, a transmitter, a receiver including an envelope detector, and means for reducing quadrature distortion in the intelligence wave appearing at the receiver output comprising a shaping circuit connected in the system to act on the transmitted wave prior to its application to said detector and arranged to reduce quadrature distortion at the output of said detector at the expense of distortion of the in-phase components of the transmitted wave, and an equalizer circuit acting upon the output of said detector and arranged to correct the distortion of the demodulated output corresponding to the in-phase component produced by said shaping circuit.

4. In a vestigial sideband system for transmitting intelligence waves, a transmitter, a receiver including an envelope detector and means for reducing quadrature distortion in the intelligence wave appearing at the receiver output comprising a shaping network connected in the system to act on the transmitted wave prior to its application to said detector and including in tandem a low-pass filter the transmission of which is substantially uniform at a given level in one sideband and falls in the interval between the carrier frequency and a frequency in the other sideband removed from the carrier by an amount $f$ to a reduced value which is maintained in the rest of the other sideband and a high-pass filter the transmission of which is substantially uniform at said level in said other sideband and falls to substantially zero in the interval between the carrier and a frequency in said one sideband removed from said carrier by said amount $f$, and an equalizer circuit acting upon the output of said detector and arranged to correct distortion of the in-phase component of the transmitted wave introduced as a result of the reduction of quadrature distortion at the detector output.

5. In a vestigial sideband system for transmitting intelligence waves, a transmitter, a receiver including an envelope detector, and means for reducing quadrature distortion in the intelligence wave appearing at the receiver output comprising a shaping network connected in the system to act on the transmitted wave prior to its application to said detector and arranged to reduce quadrature distortion at the output of said detector at the expense of distortion of the in-phase components of the transmitted wave, said shaping network comprising high and low-pass filters having a combined transmission characteristic which is substantially symmetrical about the carrier for the desired vestigial sideband and a corresponding portion of the other sideband, and an equalizer accepting the output of said detector and having lower transmission over the range of demodulated frequencies corresponding to the range of frequencies falling in the symmetrical portion of the transmission characteristic of said shaping network to correct the distortion of the reproduced intelligence wave corresponding to said in-phase component.

6. In a vestigial sideband system for transmitting intelligence waves, means for modulating a carrier wave to produce an output including the carrier and both sidebands, a shaping circuit arranged to suppress one sideband except at frequencies removed from said carrier by amounts less than $f$ and to exalt the carrier and both sidebands over the range of frequencies adjacent the carrier in both sidebands which are removed from said carrier by amounts less than $f$, means for transmitting the output of said shaping circuit, an envelope detector for accepting the transmitted wave and arranged to produce an output signal corresponding to the envelope of said transmitted wave and an equalizer accepting the output of said detector and arranged to compensate for distortion of the in-phase component of the transmitted wave introduced by said shaping circuit.

7. In a vestigial sideband system for transmitting intelligence waves, a transmitter including a modulator for producing from said intelligence wave an output including a carrier and sidebands, a network shaping the output of said modulator and suppressing one sideband except in region adjacent the carrier frequency in that sideband and modifying the transmission of the other sideband in the corresponding area, an envelope detector for accepting the output of said shaping network after transmission and arranged to produce a quantity corresponding to the envelope of the transmitted wave, means for effectively modifying the characteristic of said shaping networks to reduce quadrature distortion at the output of said detector comprising means for producing a signal having a carrier which is in quadrature with the carrier employed in said modulator modulated by a quantity derived from said message wave and in quadrature therewith, and means for adding said signal to the output of said modulator; and an equalizer connected in the output of said envelope detector for correcting distortion in the in-phase component of the demodulated signal produced by the addition of said extra component to the output of said modulator.

8. In a vestigial sideband system for transmitting intelligence waves, a modulator, a carrier oscillator, means for applying the intelligence wave and the output of said carrier oscillator to said modulator to produce an output including the carrier frequency and upper and lower sidebands, a mixer, a vestigial sideband shaping network the action of which introduces a quadrature component into the modulated wave, a second modulator, means for applying the output of said carrier oscillator to said second modulator after a phase shift of 90 degrees, means for shifting the phase of said intelligence wave by 90 degrees and shaping said wave to correspond to the quadrature component introduced by said shaping network, means for applying the output of said second modulator to said mixer for combination with the output of said first modulator, means for transmitting the output of said shaping network, an envelope detector for said transmitted wave and an equalizer connected in the output of said envelope detector and arranged to correct for distortion in the in-phase component of the transmitted wave introduced by the addition of the output of said second modulator to the signal applied to said shaping network.

References Cited in the file of this patent

UNITED STATES PATENTS

| | | |
|---|---|---|
| 1,819,054 | Affel | Aug. 18, 1931 |
| 2,048,080 | Potter | July 21, 1936 |
| 2,187,978 | Lewis | Jan. 23, 1940 |
| 2,258,047 | Collard | Oct. 7, 1941 |

OTHER REFERENCES

"A High-Level Single Sideband Transmitter," by O. G. Villard; Proc. IRE, vol. 36, No. 11, November 1948, pages 1419–1425.